United States Patent
Haas et al.

(10) Patent No.: US 12,358,629 B2
(45) Date of Patent: Jul. 15, 2025

(54) AIR DISTRIBUTION PANEL FOR DISTRIBUTING AIR AND SENSING ENVIRONMENTAL CONDITIONS

(71) Applicant: The Boeing Company, Chicago, IL (US)

(72) Inventors: William C. Haas, Chicago, IL (US); Nicholas A. Jones, Chicago, IL (US)

(73) Assignee: The Boeing Company, Arlington, VA (US)

( * ) Notice: Subject to any disclaimer, the term of this patent is extended or adjusted under 35 U.S.C. 154(b) by 414 days.

(21) Appl. No.: 17/843,621

(22) Filed: Jun. 17, 2022

(65) Prior Publication Data
US 2023/0406516 A1  Dec. 21, 2023

(51) Int. Cl.
*B64D 13/06* (2006.01)
*B64D 13/08* (2006.01)
*B64D 13/00* (2006.01)

(52) U.S. Cl.
CPC .............. *B64D 13/08* (2013.01); *B64D 13/06* (2013.01); *B64D 2013/003* (2013.01); *B64D 2013/0625* (2013.01)

(58) Field of Classification Search
CPC .. F24F 13/00; F24F 13/06; F24F 13/08; F24F 13/26; B64D 13/06; B64D 13/08
See application file for complete search history.

(56) References Cited

U.S. PATENT DOCUMENTS

| | | | |
|---|---|---|---|
| 2,613,587 A | 10/1952 | MacCracken | |
| 3,368,406 A * | 2/1968 | Himebaugh | G01K 13/02 374/138 |
| 3,592,182 A * | 7/1971 | Richardson | F24F 6/02 261/95 |
| 3,687,054 A * | 8/1972 | Boberg | B64D 13/00 454/76 |

(Continued)

FOREIGN PATENT DOCUMENTS

WO  WO-2018193335 A1 * 10/2018 ............. B64D 13/06

OTHER PUBLICATIONS

Extended European Search Report prepared by the European Patent Office in Application No. EP 23 17 8895.1 dated Oct. 30, 2023.

*Primary Examiner* — Steven S Anderson, II
(74) *Attorney, Agent, or Firm* — Hanley, Flight & Zimmerman, LLC

(57) ABSTRACT

An air distribution panel for aircraft comprises a primary air inlet port, a housing fluidly coupled to the primary air inlet port, and an environmental sensor. The primary air inlet port is configured to be fluidly coupled to and receive primary air from an air distribution plenum. The housing comprises an air outlet chamber and a secondary air inlet chamber. The primary air is exhausted into an aircraft compartment via the air outlet chamber. Secondary air is drawn from the aircraft compartment via the secondary air inlet chamber. Exhausting of the primary air through the air outlet chamber causes the secondary air to be passively drawn into the secondary air inlet chamber. The environmental sensor is positioned (Continued)

within the secondary air inlet chamber and along an airflow path of the secondary air. The secondary air is exhausted via the air outlet chamber back into the aircraft compartment after the secondary air passes the temperature sensor.

20 Claims, 6 Drawing Sheets

(56) References Cited

U.S. PATENT DOCUMENTS

| | | | |
|---|---|---|---|
| 6,024,639 | A * | 2/2000 | Scherer .................. B64D 13/00 |
| | | | 340/584 |
| 6,619,589 | B2 | 9/2003 | Brasseur et al. |
| 6,971,607 | B2 | 12/2005 | McColgan et al. |
| 7,028,753 | B2 | 4/2006 | Sterner |
| 9,511,868 | B2 | 12/2016 | Stengel et al. |
| 10,527,313 | B2 * | 1/2020 | Wolgamott ............. F24F 13/02 |
| 2009/0311951 | A1 | 12/2009 | Walkinshaw |
| 2010/0009617 | A1 | 1/2010 | Huber et al. |
| 2013/0214091 | A1 | 8/2013 | Hillel |
| 2016/0033152 | A1 | 2/2016 | Ellsworth et al. |
| 2016/0231031 | A1 | 8/2016 | Bruno |
| 2016/0377316 | A1 | 12/2016 | Ellsworth et al. |
| 2019/0055024 | A1 | 2/2019 | Fagundes et al. |
| 2019/0085770 | A1 | 3/2019 | Combes et al. |
| 2020/0262567 | A1 | 8/2020 | Meckes et al. |
| 2021/0387736 | A1 * | 12/2021 | Schonhoff ............. B64D 13/00 |
| 2021/0393843 | A1 | 12/2021 | Trent et al. |

\* cited by examiner

AIR DISTRIBUTION PANEL FOR DISTRIBUTING AIR AND SENSING ENVIRONMENTAL CONDITIONS

BACKGROUND

Field

This application generally relates to aircraft environmental control systems. In particular, this application relates to an air distribution panel for distributing air and sensing environmental conditions.

Description of Related Art

Modern passenger transport aircraft typically operate at elevated altitudes to avoid weather and to obtain other advantages generally associated with high altitude flight. Accordingly, such aircraft are equipped with environmental control systems that provide pressurized and temperature-controlled air to various compartments of the aircraft, such as the passenger compartment, cargo hold, etc. Some environmental control systems extract air at an elevated temperature and pressure from a compressor section of one or more of the engines of the aircraft, condition the extracted air, and distribute the conditioned air to the aircraft compartments.

Air temperatures within the various compartments are generally regulated to achieve a desired comfort level for flight crew and passengers. To facilitate such regulation, various temperature sensing devices may be positioned throughout the aircraft, such as proximate the flight deck, passenger compartment, cargo hold, etc. These temperature sensing devices are in communication with one or more environmental control systems that are configured to admit additional cold air when additional cooling is desired and to correspondingly add additional higher temperature air when additional heating is desired. Typical temperature sensing devices include a powered fan configured to draw cabin air into an air duct that contains a temperature sensor.

SUMMARY

In a first aspect, an air distribution panel for aircraft comprises a primary air inlet port, a housing fluidly coupled to the primary air inlet port, and an environmental sensor. The primary air inlet port is configured to be fluidly coupled to and receive primary air from an air distribution plenum. The housing comprises an air outlet chamber and a secondary air inlet chamber. The primary air is exhausted into an aircraft compartment via the air outlet chamber. Secondary air is drawn from the aircraft compartment via the secondary air inlet chamber. Exhausting of the primary air through the air outlet chamber causes the secondary air to be passively drawn into the secondary air inlet chamber. The environmental sensor is positioned within the secondary air inlet chamber and along an airflow path of the secondary air. The secondary air is exhausted via the air outlet chamber back into the aircraft compartment after the secondary air passes the temperature sensor.

In a second aspect, a method for sensing an environment of a compartment of an aircraft comprises receiving primary air via a primary air inlet port configured to be fluidly coupled to an air distribution plenum. The primary air is exhausted into an aircraft compartment via an air outlet chamber of a housing that is fluidly coupled to the primary air inlet port. Secondary air is drawn in from the aircraft compartment via a secondary air inlet chamber of the housing. Exhausting of the primary air through the air outlet chamber causes the secondary air to be passively drawn into the secondary air inlet chamber. The method further comprises sensing an environment of the secondary air via an environmental sensor positioned within the secondary air inlet chamber and along an airflow path of the secondary air. The secondary air is exhausted via the air outlet chamber back into the aircraft compartment after the secondary air passes the temperature sensor.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

Figure 1:
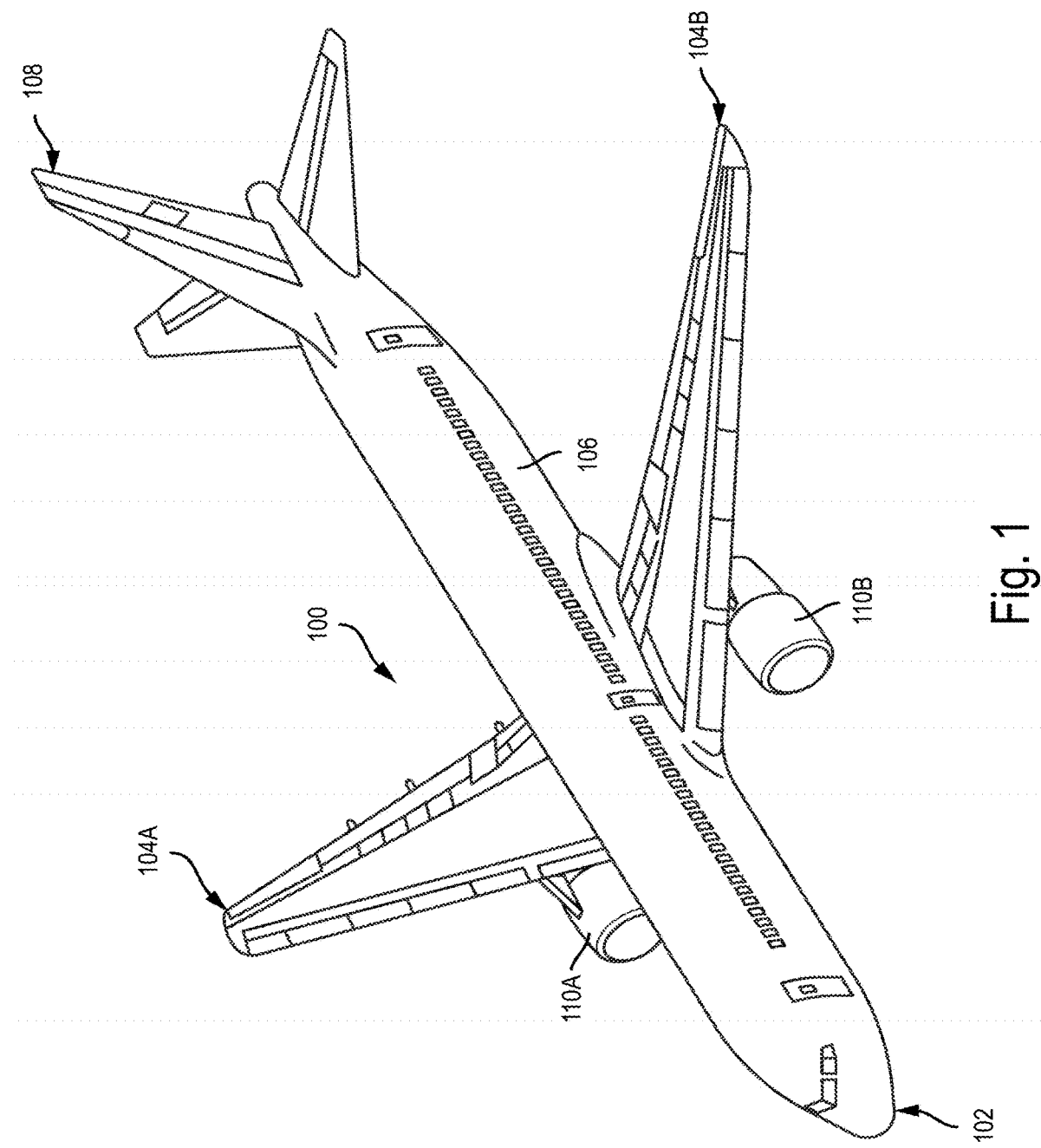
FIG. 1 illustrates an aircraft, in accordance with example embodiments.

The figures are schematic, not necessarily to scale, and generally only show aspects that are necessary to elucidate example embodiments, wherein other aspects may be omitted or merely suggested.

DETAILED DESCRIPTION

Numerous examples of systems, devices, and/or methods are described herein. Any embodiment, implementation, and/or feature described herein as being an example is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially" or "about" that may be used herein are meant that the recited characteristic, parameter, or value need not be achieved exactly, but that deviations or variations, including, for example, tolerances, measurement error, measurement accuracy limitations and other factors known to those skilled in the art, may occur in amounts that do not preclude the effect the characteristic was intended to provide.

Introduction

As noted above, typical temperature sensing devices in aircraft include powered fans. These fans are configured to draw cabin air into an air duct that contains a temperature sensor. These fans, however, require a non-trivial amount of space and require a source of power. Moreover, the fans can generate noise and require maintenance from time to time (e.g., to remove debris). These problems are compounded as the number of regions where temperature sensing is required increases.

These and other issues are ameliorated by various systems and methods disclosed herein for sensing environmental conditions of an aircraft and, in particular, example air distribution panels that facilitate simultaneous distribution of air in an aircraft compartment and environmental condition sensing of the aircraft compartment without requiring the fans noted above.

For instance, an example of an air distribution panel for an aircraft comprises a primary air inlet port, a housing fluidly coupled to the primary air inlet port, and one or more environmental sensors. The primary air inlet port is configured to be fluidly coupled to and receive primary air from an air distribution plenum. An example of the primary air inlet port corresponds to a slip fitting configured to be slip-fitted to a corresponding section of the air distribution plenum.

The housing is fluidly coupled to the primary air inlet port and comprises an air outlet chamber and a secondary air inlet chamber. The primary air is exhausted into the aircraft via the air outlet chamber, and secondary air is drawn from the aircraft compartment via the secondary air inlet chamber. The housing is configured so that exhausting of the primary air through the air outlet chamber causes the secondary air to be passively drawn into the secondary air inlet chamber. For example, the air outlet chamber is configured as an expansion chamber that causes the secondary air to be drawn into the secondary air inlet chamber due to the Venturi effect.

An example of the housing comprises a first sidewall and a pair of opposing sidewalls that extend from opposite edge regions of the first sidewall. The first sidewall and the pair of opposing sidewalls define an opening. A second sidewall spans the opening and divides the opening into a pair of openings that correspond respectively to an air outlet port and a secondary air inlet port. Some examples of the second sidewall have a profile that corresponds to an airfoil.

One or more environmental sensors are positioned within the secondary air inlet chamber and along an airflow path of the secondary air. Examples of the environmental sensors correspond to temperature sensors, smoke sensors, etc.

In some examples, the flow rate of the primary air through the air outlet chamber 315 is about 90 cubic feet per minute (CFM). In some examples, the air distribution panel is configured so that this flow rate causes a corresponding flow rate of about 30 CFM of secondary air into the secondary air inlet chamber.

FIG. 1 illustrates an example of an aircraft 100. The aircraft 100 includes a nose 102, wings 104A-B, a fuselage 106, a tail 108, and engines 110A-B. Although FIG. 1 illustrates an example of a commercial passenger aircraft, other types of aircraft are used with examples described herein. In addition, depending on the type of aircraft, fewer or more engines are included.

Figure 2B:
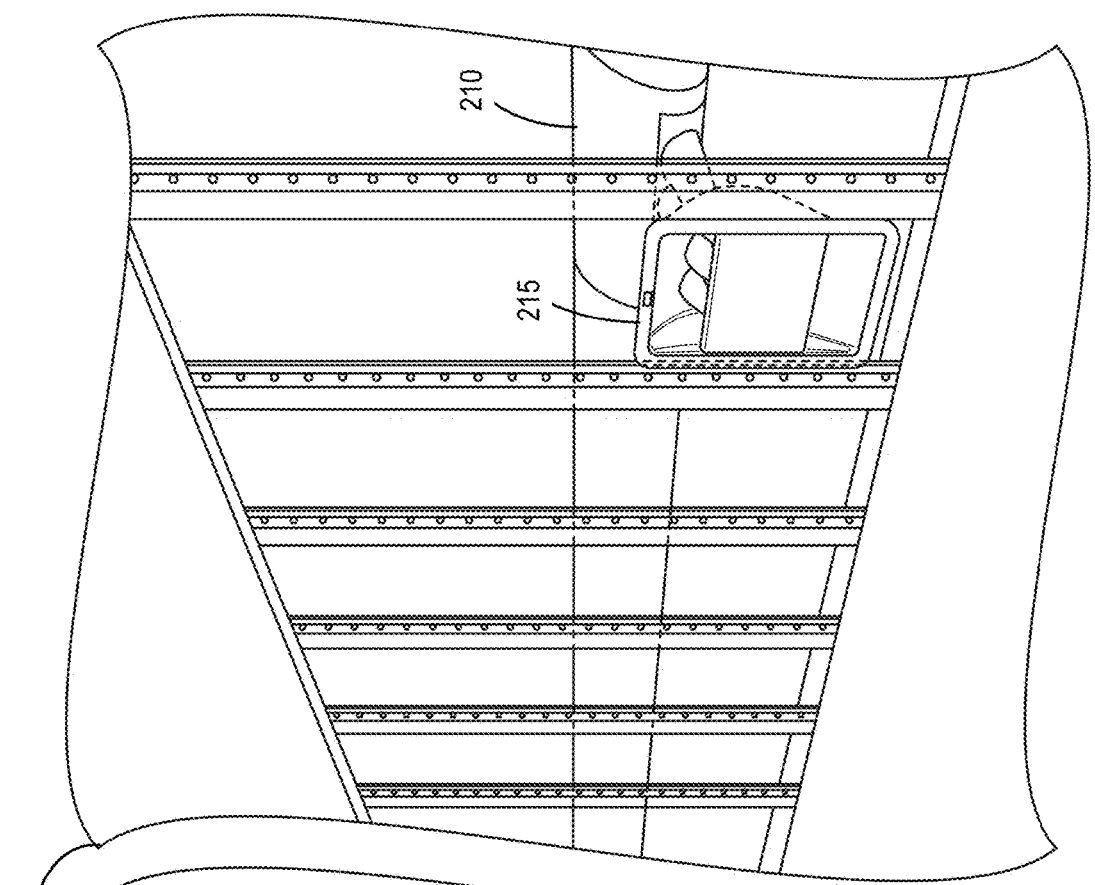
FIG. 2B illustrates an aircraft compartment of an aircraft, in accordance with example embodiments.
Figure 2A:
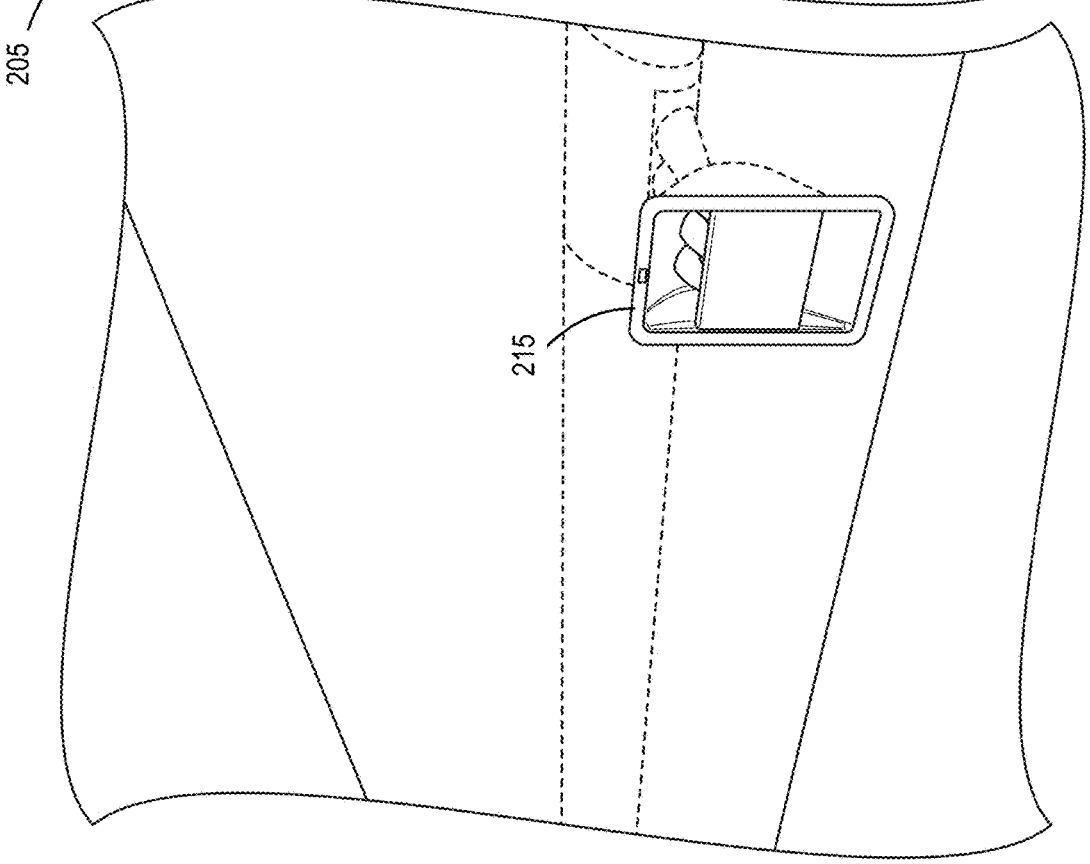
FIG. 2A illustrates an aircraft compartment of an aircraft, in accordance with example embodiments.

FIGS. 2A and 2B illustrate an example of an aircraft compartment 205 of the aircraft 100 (e.g., a cargo hold of the aircraft 100). Some examples of the aircraft compartment 205 include framing that extends between the floor and the ceiling of the aircraft compartment 205. In some examples, the space between the framing and the skin of the fuselage of the aircraft 100 defines a mechanical chase in which one or more hydraulic lines, plenums, electrical lines, etc., are housed.

In some examples, an air distribution plenum 210 extends within the chase. An example of the air distribution plenum 210 corresponds to a cylindrical conduit having an air inlet port that is fluidly coupled to a blower. For example, the air distribution plenum 210 may receive compressed, clean air from compressor stages of the engines 110A-B or when on the ground from an auxiliary power unit (APU) or a ground source. Air distribution plenums having different shapes are contemplated (e.g., square profile, rectangular profile, oval profile, etc.)

One or more air distribution panels 215 are fluidly coupled to and positioned along the length of the air distribution plenum 210. The air distribution panels 215 are configured to receive primary air 325 from the air distribution plenum 210 and to distribute the primary air 325 throughout the aircraft compartment 205. Some examples of the air distribution panel 215 are also configured to sense environmental conditions of the aircraft compartment 205 (e.g., temperature of the aircraft compartment 205, whether there is smoke in the aircraft compartment 205, etc.). Some examples of the sensed conditions are communicated to one or more control systems that are configured to control the environment of the aircraft compartment 205 based on the sensed conditions. For example, a sensed temperature can be used to control an amount or temperature of primary air 325 blowing through the air distribution plenum 210 to regulate the temperature of the aircraft compartment 205. The sensing of smoke can trigger an alarm or a purging action to purge the aircraft compartment 205 of smoke, etc.

Some examples of the air distribution panel 215 are configured to be fixed or fastened between framing members of the framing (e.g., between vertical framing members). In some examples, one or more wall panels cover the framing members and the air distribution panel 215 is fixed to one of the wall panels. In this regard, some examples of the wall panel and the air distribution panel 215 are integrally formed (e.g., via an injection molding operation).

Figure 3A:
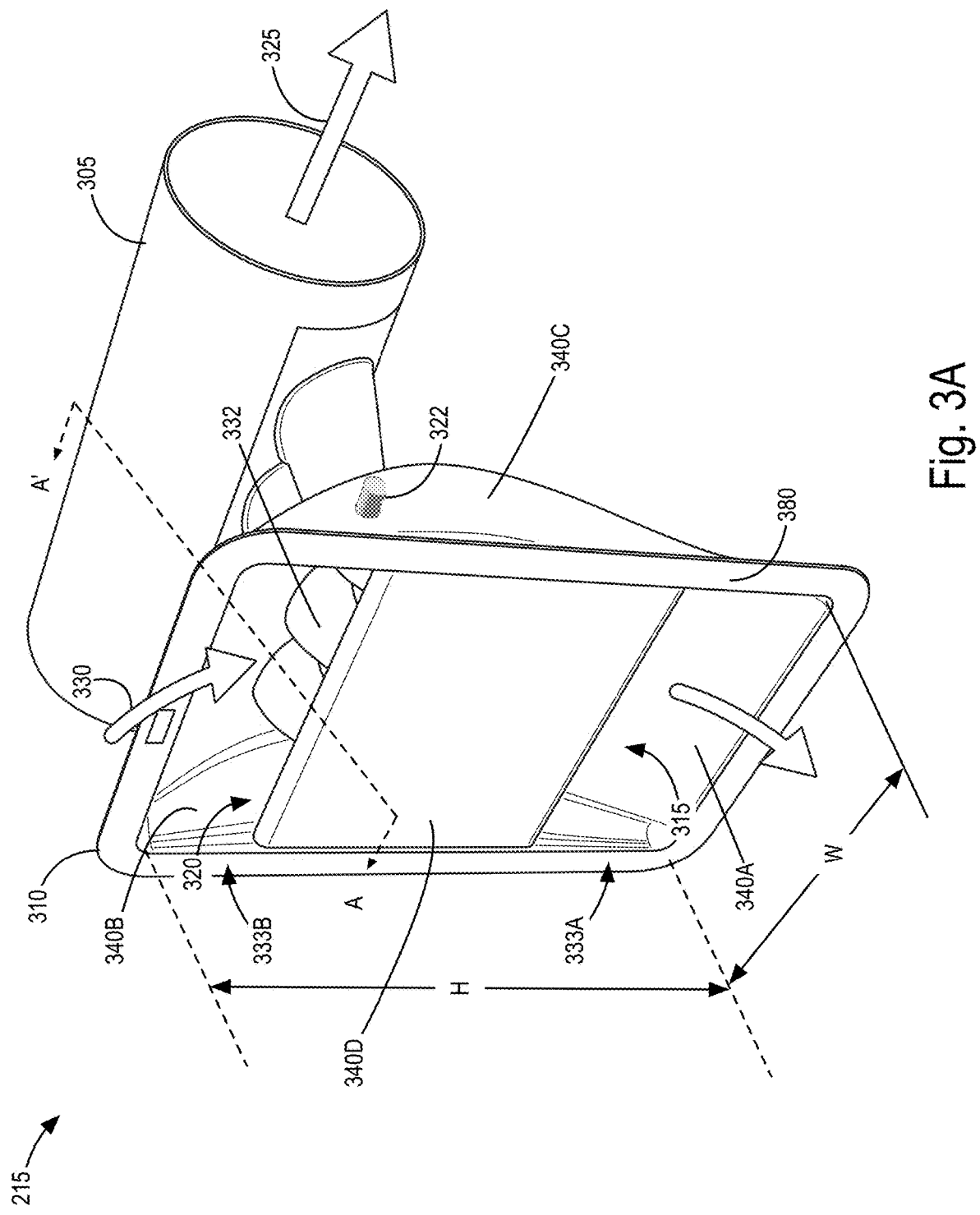
FIG. 3A illustrates a perspective view of an air distribution panel, in accordance with example embodiments.
Figure 3B:
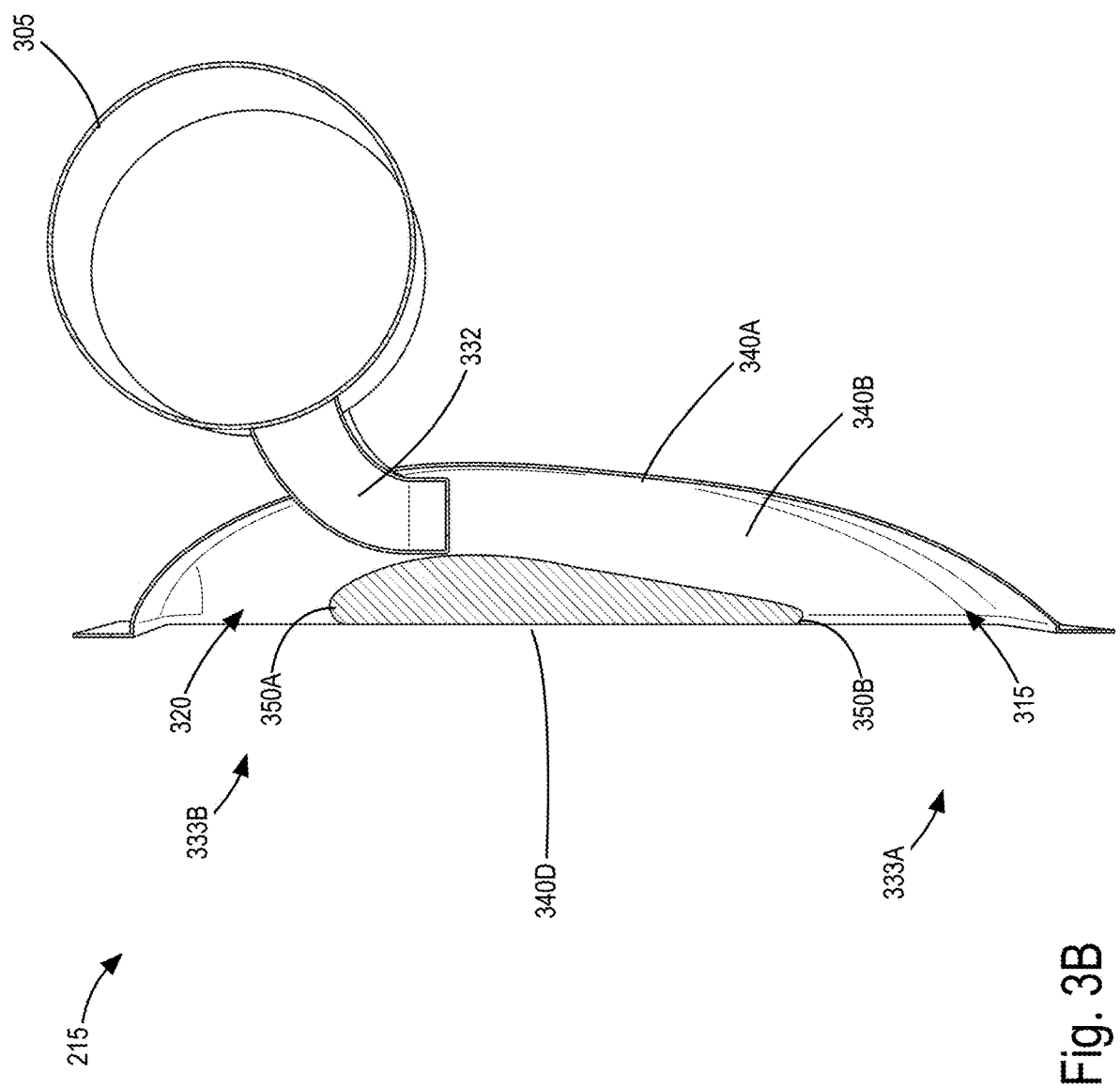
FIG. 3B illustrates a cross-section view of the air distribution panel taken along section A-A', in accordance with example embodiments.
Figure 3C:
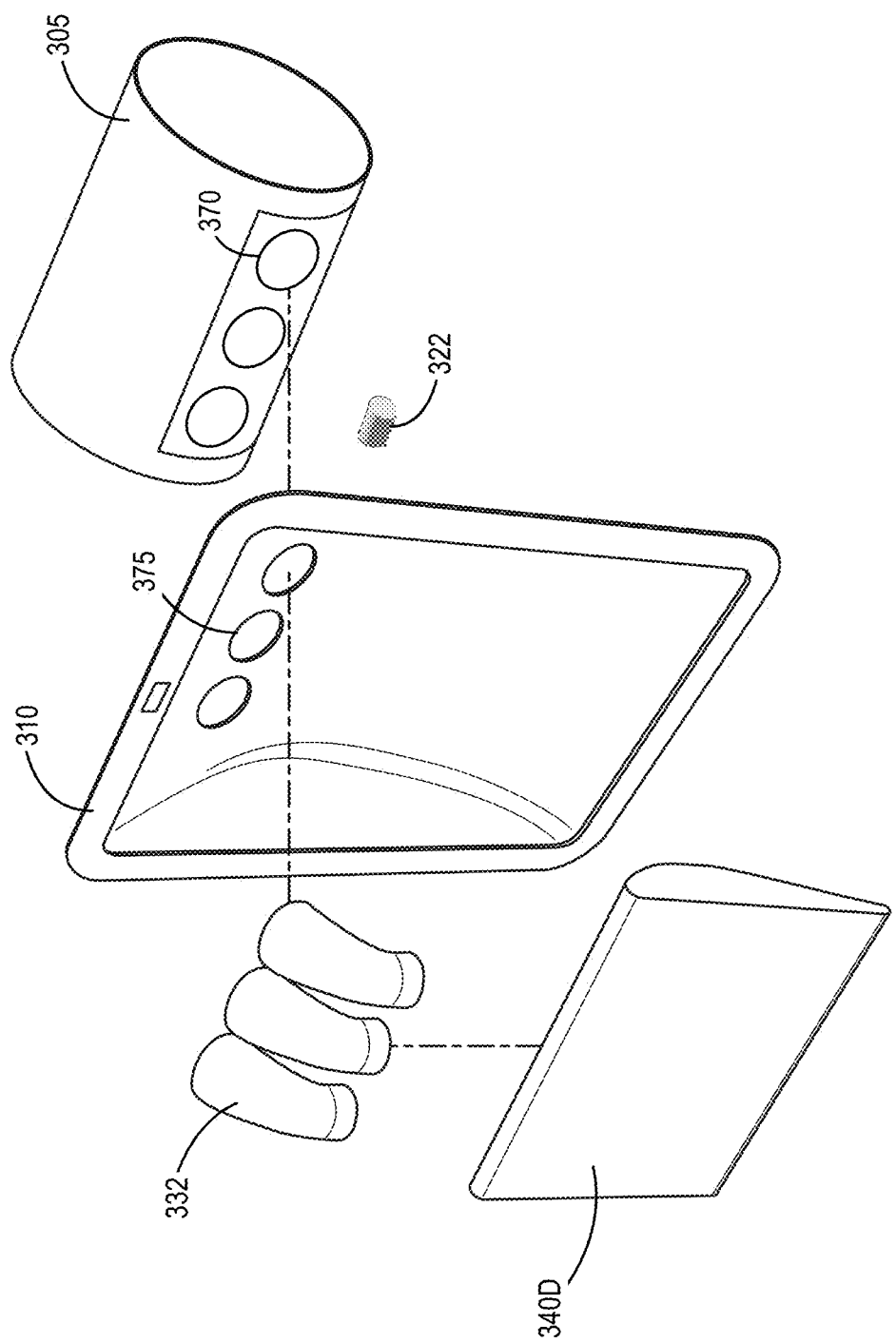
FIG. 3C illustrates an exploded view of an air distribution panel, in accordance with example embodiments.

FIG. 3A illustrates a perspective view of an example of an air distribution panel 215. FIG. 3B illustrates a cross-section view of the air distribution panel 215 taken along section A-A'. FIG. 3C illustrates an exploded view of an example of an air distribution panel 215.

Referring to the figures, some examples of the air distribution panel 215 comprise a primary air inlet port 305, a housing 310 fluidly coupled to the primary air inlet port 305, and an environmental sensor 322.

Some examples of the primary air inlet port 305 are configured to be fluidly coupled to and receive primary air 325 from an air distribution plenum 210. In this regard, some examples of the primary air inlet port 305 correspond to a slip fitting configured to be slip-fitted between corresponding sections of the air distribution plenum 210. For instance, examples of the primary air inlet port 305 and the air distribution plenum 210 have cylindrical shapes and the diameter of the primary air inlet port 305 is configured to be a margin larger or smaller than the diameter of the air distribution plenum 210 to facilitate sliding the primary air inlet port 305 over or within the air distribution plenum 210. For instance, an example of the air inlet port 305 has a diameter of about 5 inches.

Another example of the air inlet port 305 corresponds to a saddle fitting that is configured to fit over a surface section of the air distribution plenum 210. For instance, the curvature of the saddle fitting matches the curvature of the surface section of the air distribution plenum 210. In this regard, some examples of the air distribution plenum 210 define an opening within the surface section through which primary air 325 is communicated to the air inlet port 305.

Some examples of the housing 310 comprise an air outlet chamber 315 through which the primary air 325 is exhausted into an aircraft compartment 205 and a secondary air inlet chamber 320 through which secondary air 330 is drawn from the aircraft compartment 205. The housing 310 is configured so that the flow of primary air 325 through the air outlet chamber 315 causes the secondary air 330 to be passively drawn into the secondary air inlet chamber 320 (e.g., due to the Venturi effect).

Some examples of the housing 310 comprise a first sidewall 340A and a pair of opposing sidewalls 340B, 340C that extend from opposite edge regions of the first sidewall 340A. The first sidewall 340A and the pair of opposing sidewalls 340B, 340C define an opening. An example of the opening has a width, W, of about 10 inches, and a height, H, of about 14 inches. A second sidewall 340D spans the opening and is configured to divide the opening into a pair of openings that correspond respectively to an air outlet port 333A that corresponds with the air outlet chamber 315 and a secondary air inlet port 333B that corresponds with the secondary air inlet chamber 320. Respective widths of the air outlet port 333A and the secondary air inlet port 333B generally match the width of the opening defined by the first sidewall 340A and the pair of opposing sidewalls 340B, 340C. In some examples, the respective heights of the air outlet port 333A and the secondary air inlet port 333B are the same and correspond to about 3 inches. In some examples, the respective heights of the air outlet port 333A and the secondary air inlet port 333B are different. For example, the ratio of the height of the air outlet port 333A to the height of the secondary air inlet port 333B is 2:1. In other examples, the ratio of the height of the air outlet port 333A to the height of the secondary air inlet port 333B is 3:2.

In some examples, the housing 310 is fluidly coupled to the primary air inlet port 305 via one or more nozzles 332. In the case of multiple nozzles 332, in some examples, each of the nozzles 332 is separated to allow for the flow of secondary airflow 330 into the air outlet chamber 315 through gaps between the nozzles.

Some examples of the nozzle 332 are fluidly coupled to the primary air inlet port 305 and configured to direct primary air 325 into the air outlet chamber 315. In this regard, some examples of the nozzle 332 have a curved profile configured to change the direction of primary air 325 so that the primary air 325 has a somewhat laminar flow over facing surfaces of the first sidewall 340A and the second sidewall 340D into the air outlet chamber 315 and towards the air outlet port 333A.

As shown in FIG. 3B, some examples of the second sidewall 340D have a profile that corresponds to an airfoil. In this regard, in some examples, the leading edge 350A of the airfoil is positioned within the secondary air inlet chamber 320 and the trailing edge 350B of the airfoil is positioned within the air outlet chamber 315. The combined shape of the second sidewall 340D and the first sidewall 340A define an expansion chamber in the air outlet chamber 315. For example, the distance between facing surfaces of the first sidewall 340A and the second sidewall 340D gradually increases along the length of the air outlet chamber 315 towards the air outlet port 333A.

Some examples of the environmental sensor 322 are positioned within the secondary air inlet chamber 320 and along an airflow path of the secondary air 330. Some examples of the environmental sensor 322 correspond to a temperature sensor. An example of the temperature sensor 322 senses a change in temperature by a voltage increase across terminals when the temperature rises, followed by a voltage drop between the terminals when the temperature drops. The change in temperature is converted to an electrical signal that is transmitted as a frequency to a read-out unit. In one example, the temperature sensor 322 is a contact type temperature sensor that measures a degree of hotness or coolness by being in direct contact with the air.

Some examples of the environmental sensor 322 correspond to smoke sensors. An example of the smoke sensor comprises a light-emitting device and a light-receiving device that face one another so that light communicated by the light-emitting device is received by the light-receiving device. An electrical signal proportional to the amount of light received by the light-receiving device is communicated to a control system. When particulates pass between the light-emitting device and the light-receiving device, the communication of light is obstructed and sensed by the control system. The control system can then perform an action (e.g., trigger an alarm, cause purging air to flow into the aircraft compartments 205, etc.).

Another example of the smoke sensor comprises a pair of ionization chambers. One of the ionization chambers is open to the secondary air in which smoke particles may be present, and the other corresponds to a reference chamber that does not allow the entry of particles. A difference in the conductivity of the air within the respective chamber is indicative of the presence of smoke particles. An electrical signal proportional to this difference is communicated to the control system. When the difference exceeds a threshold difference, the control system can then perform an action (e.g., trigger an alarm, cause purging air to flow into the aircraft compartments 205, etc.).

In some examples of the air distribution panel 215, the primary air inlet port 305, housing 310, second sidewall 340D, and the nozzles are parts of a monolithic structure (e.g., formed in a single molding operation). As shown in FIG. 3C, in some examples, these components are assembled. For instance, an example of the primary air inlet port 305 comprises one or more openings 370 for receiving respective first ends of one or more of the nozzles 332. The first sidewall 340A of the housing 310 defines one or more openings 375 for receiving respective second ends of the one or more nozzles 332. The pair of opposing sidewalls 340B, 340C and/or the second sidewall 340D are configured to facilitate releasably securing the second sidewall 340D to the housing 310.

In operation, an example of the air distribution panel 215 is installed by first coupling the primary air inlet port 305 to the air distribution plenum 210. As noted above, an example of the primary air inlet port 305 corresponds to a slip fitting configured to be slip-fitted between corresponding sections of the air distribution plenum 210. Another example of the air inlet port 305 corresponds to a saddle fitting that is configured to fit over a surface section of the air distribution plenum 210.

Next, one or more nozzles 332 are inserted into corresponding nozzle openings 370 of the primary air inlet port 305. In some examples, the openings 370 and/or nozzles are configured to be releasably secured to the primary air inlet port 305. In some examples, an elastomeric seal is positioned between the nozzles 332 and nozzle openings 370 of the primary air inlet port 305 to form a substantially air-tight seal between the nozzles 332 and the primary air inlet port 305

The housing 310 is then oriented to allow the respective second ends of the nozzles 332 to pass through the nozzle openings 375 of the housing 310 and slide over the nozzles 332. The housing 310 is then re-oriented so that output openings of the nozzles generally abut the first sidewall 340A of the housing 310. In some examples, an elastomeric seal is positioned between the nozzles 332 and the nozzle openings 375 of the housing 310 to form a substantially air-tight seal between the nozzles 332 and the housing 310.

The second sidewall 340D is then secured between the pair of opposing sidewalls 340B, 340C of the housing 310 and over the nozzles 332.

Some examples of the housing 310 define a flange 380. Thus, in a subsequent operation, the flange 380 may be fixed or fastened, for example, between framing members of the aircraft compartment 205.

Figure 4:
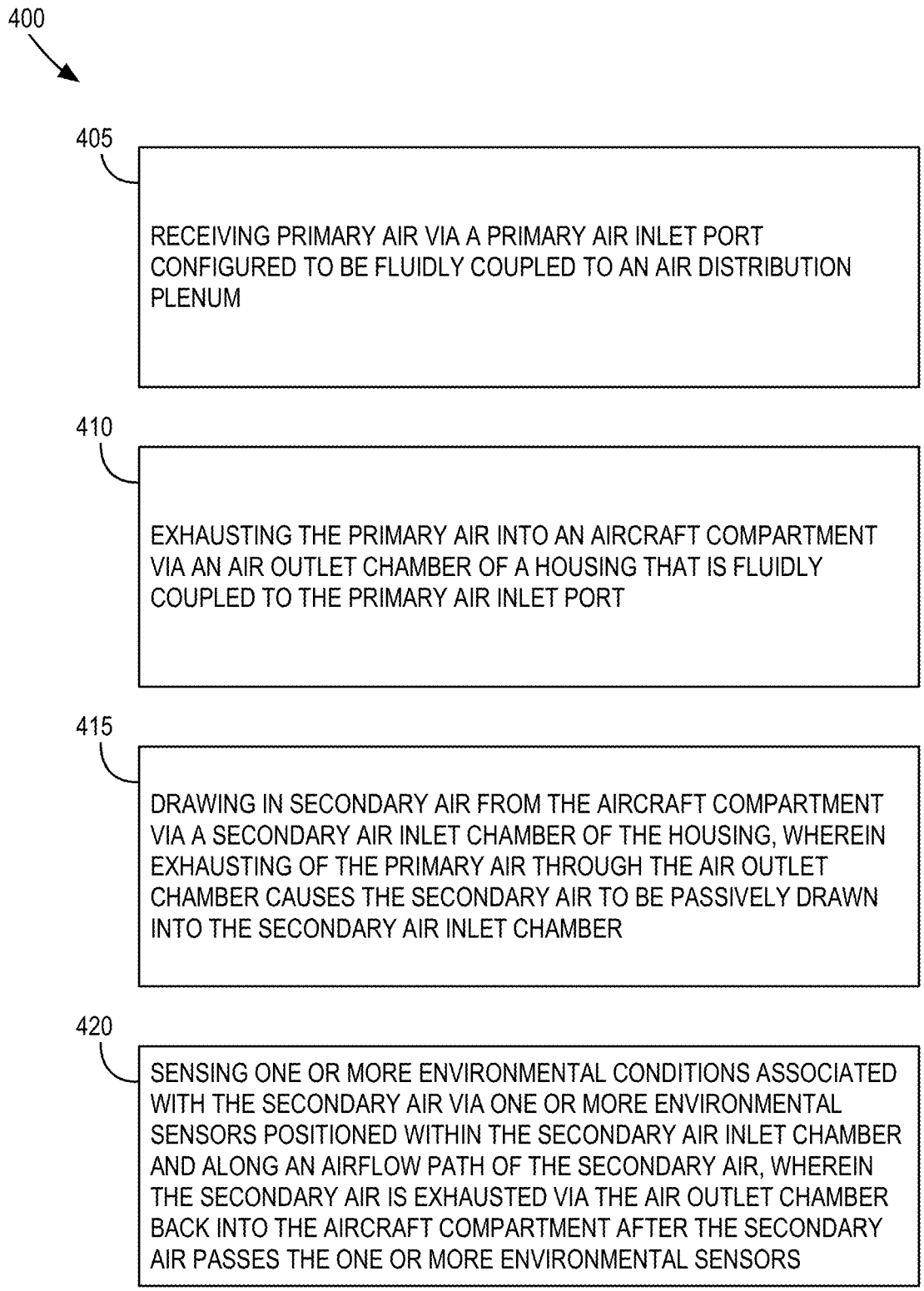
FIG. 4 illustrates operations that facilitate sensing environmental conditions of a compartment of an aircraft, in accordance with example embodiments.

FIG. 4 illustrates operations 400 that facilitate sensing environmental conditions of a compartment of an aircraft. These operations are best understood with reference to the air distribution panel 215 depicted in the figures described above.

The operations at block 405 involve receiving primary air 325 via a primary air inlet port 305 configured to be fluidly coupled to an air distribution plenum 210.

The operations at block 410 involve exhausting the primary air 325 into an aircraft compartment 205 via an air outlet chamber 315 of a housing 310 that is fluidly coupled to the primary air inlet port 305.

The operations at block 415 involve drawing in secondary air 330 from the aircraft compartment 205 via a secondary air inlet chamber 320 of the housing 310. Exhausting of the primary air 325 through the air outlet chamber 315 causes the secondary air 330 to be passively drawn into the secondary air inlet chamber 320.

The operations at block 420 involve sensing one or more conditions of the secondary air 330 via a sensor 322 positioned within the secondary air inlet chamber 320 and along an airflow path of the secondary air 330. The secondary air 330 is exhausted via the air outlet chamber 315 back into the aircraft compartment 205 after the secondary air 330 passes the temperature sensor 322.

In some examples, the operations that involve exhausting of the primary air 325 into an aircraft compartment 205 via the air outlet chamber 315 of the housing 310 further involve exhausting the primary air 325 into the aircraft compartment 205 via an air outlet chamber 315 of a housing 310 that comprises a first sidewall 340A, a pair of opposing sidewalls 340B, 340C that extend from opposite edge regions of the first sidewall 340A, and a second sidewall 340D. The first sidewall 340A and the pair of opposing sidewalls 340B, 340C define an opening, and the second sidewall 340D spans the opening and divides the opening into a pair of openings that correspond respectively to an air outlet port 333A and a secondary air inlet port 333B.

In some examples, the operations that involve exhausting of the primary air 325 into the aircraft compartment 205 via the air outlet chamber 315 of the housing 310 that comprises the second sidewall 340D further involve exhausting the primary air 325 into the aircraft compartment 205 via an air outlet chamber 315 of a housing 310 that comprises a second sidewall 340D having a profile that corresponds to an airfoil.

In some examples, the operations that involve exhausting of the primary air 325 into the aircraft compartment 205 via the air outlet chamber 315 further involve exhausting the primary air 325 into the aircraft compartment 205 via an air outlet chamber 315 that corresponds to an expansion chamber.

Some examples of the operations further involve directing primary air 325 into the air outlet chamber 315 via at least one nozzle 332 fluidly coupled to the primary air inlet port 305.

Some examples of the operations further involve directing primary air 325 into the air outlet chamber 315 via a plurality of nozzles 332 fluidly coupled to the primary air inlet port 305. Each of the plurality of nozzles 332 is separated by a gap through which the secondary air 330 flows into the air outlet chamber 315.

In some examples, the operations that involve drawing the secondary air 330 from the aircraft compartment 205 via the secondary air inlet chamber 320 further involve drawing the secondary air 330 into the secondary air inlet chamber 320 via a venturi effect.

In some examples, the operations that involve sensing the temperature of the secondary air 330 via the temperature sensor 322 positioned within the secondary air inlet chamber further involve sensing the temperature of the secondary air 330 via a temperature sensor that has a portion that extends through an opening of the housing 310, wherein the opening is proximate the secondary air inlet chamber 320.

In some examples, the operations that involve receiving the primary air 325 via the primary air inlet port 305 further involve receiving the primary air 325 via a primary air inlet port 305 that corresponds to a slip fitting configured to be slip-fitted to a corresponding section of the air distribution plenum 210.

Using any of the air distribution panels described herein allows air temperatures to be determined while providing a tamper-proof temperature sensing device that is remotely located and out of sight from passengers. Further, since the air distribution panels do not include a fan to draw cabin air into the housing 310 that contains the temperature sensor, the air distribution panels operate with decreased noise and decreased power requirements as compared to conventional temperature sensing devices. In addition, removing a fan and a moving part from the design decreases the complexity of the air distribution panels and reduces periodic service and replacement that would otherwise be needed.

Thus, within examples, the air distribution panels described herein can be used to replace a typical powered fan device used to draw cabin air using the gasper air system. The air distribution panels described herein have many benefits including, for instance, lower cost and ease of assembly (due to fewer parts), and decreased noise (compared to conventional temperature sensing devices) with no fan operating. Further, with no moving parts, there is less of a chance to have less than optimal performance of the devices. In addition, in examples, the air distribution panels can be additively manufactured making production more efficient and in real-time.

Note that although this disclosure has been described with reference to aircraft, the same functions and devices apply equally to use of the methods and systems on board any type of vehicle to draw air past a temperature sensor in a passive manner. The methods and systems described herein also find use within non-vehicles or stationary areas as well wherever sensing of air temperatures is desired.

Different examples of the system(s), device(s), and method(s) disclosed herein include a variety of components, features, and functionalities. It should be understood that the various examples of the system(s), device(s), and method(s) disclosed herein include any of the components, features, and functionalities of any of the other examples of the system(s), device(s), and method(s) disclosed herein in any combination or any sub-combination, and all such possibilities are intended to be within the scope of the disclosure.

The description of the different advantageous arrangements has been presented for purposes of illustration and description and is not intended to be exhaustive or limited to the examples in the form disclosed. Many modifications and variations will be apparent to those of ordinary skill in the art. Further, different advantageous examples describe different advantages as compared to other advantageous examples. The example or examples selected are chosen and described to best explain the principles of the examples, the practical application, and to enable others of ordinary skill in the art to understand the disclosure for various examples with various modifications as are suited to the particular use contemplated.

What is claimed is:

1. An air distribution panel for an aircraft comprising:
a primary air inlet port to be fluidly coupled to and receive primary air from an air distribution plenum;
a housing fluidly coupled to the primary air inlet port, wherein the housing comprises:
an air outlet chamber through which the primary air is exhausted into an aircraft compartment; and
a plurality of nozzles fluidly coupled to the primary air inlet port to direct primary air to the air outlet chamber, wherein the nozzles are separated by gaps therebetween; and
a secondary air inlet chamber through which secondary air is drawn from the aircraft compartment, wherein exhausting of the primary air through the air outlet chamber causes the secondary air to be passively drawn through the gaps into the secondary air inlet chamber to be mixed with the primary air.

2. The air distribution panel according to claim 1, wherein the housing includes:
a first sidewall and a pair of opposing sidewalls that extend from opposite edge regions of the first sidewall, wherein the first sidewall and the pair of opposing sidewalls define an opening; and
a second sidewall that spans the opening, the second sidewall in contact with the nozzles, defines an air mixing chamber, and divides the opening into a pair of openings that define the air outlet chamber and the secondary air inlet chamber, respectively.

3. The air distribution panel according to claim 2, wherein a profile of the second sidewall defines an airfoil.

4. The air distribution panel according to claim 1, wherein the air outlet chamber includes an expansion chamber.

5. The air distribution panel of claim 1, wherein the secondary air is drawn into the secondary air inlet chamber due to a venturi effect.

6. The air distribution panel of claim 1, wherein the secondary air inlet chamber includes:
an opening into which a respective portion of a smoke sensor is inserted so as to be exposed to the secondary air drawn inward and flowing through the secondary air inlet chamber.

7. The air distribution panel of claim 1, wherein the primary air inlet port includes a slip fitting configured to be slip-fitted to a section of the air distribution plenum.

8. The air distribution panel of claim 1, further including one or more environmental sensors.

9. The air distribution panel of claim 1, wherein the aircraft compartment defines a cargo hold of the aircraft.

10. The air distribution panel according to claim 1, wherein a first flow rate of the primary air through the air outlet chamber is greater than a second flow rate of the secondary air into the secondary air inlet chamber.

11. The air distribution panel according to claim 1, wherein a first height of the air outlet chamber is greater than a second height of the secondary air inlet chamber.

12. The air distribution panel according to claim 2, wherein the first sidewall includes a curved surface.

13. The air distribution panel according to claim 12, wherein the curved surface is a first curved surface, and wherein the second sidewall includes a second curved surface complimentary to the first curved surface.

14. A method for controlling temperature of a compartment of an aircraft, the method comprising:
receiving primary air via a primary air inlet port that is fluidly coupled to an air distribution plenum;
exhausting the primary air into an aircraft compartment via a plurality of nozzles, wherein at least some of the nozzles are separated by a gap therebetween, and wherein at least some of the nozzles are coupled to an air outlet chamber of a housing that is fluidly coupled to the primary air inlet port; and
drawing in secondary air from the aircraft compartment through the gaps via a secondary air inlet chamber of the housing to be mixed with the primary air, wherein exhausting of the primary air through the air outlet chamber causes the secondary air to be passively drawn into the secondary air inlet chamber.

15. The method according to claim 14, wherein exhausting of the primary air into an aircraft compartment via the air outlet chamber of the housing includes:
exhausting the primary air into the aircraft compartment via an air outlet chamber of a housing that comprises a first sidewall, a pair of opposing sidewalls that extend from opposite edge regions of the first sidewall, and a second sidewall, wherein the first sidewall and the pair of opposing sidewalls define an opening, and the second sidewall spans the opening and divides the opening into a pair of openings that define the air outlet chamber and the secondary air inlet chamber, respectively.

16. The method according to claim 15, wherein exhausting of the primary air into the aircraft compartment via the air outlet chamber of the housing that includes the second sidewall includes:
exhausting the primary air into the aircraft compartment via an air outlet chamber of a housing that comprises a second sidewall having a profile that defines an airfoil.

17. The method according to claim 14, wherein exhausting of the primary air into the aircraft compartment via the air outlet chamber includes:
exhausting the primary air into the aircraft compartment via an air outlet chamber that includes an expansion chamber.

18. The method according to claim 14, wherein drawing the secondary air from the aircraft compartment via the secondary air inlet chamber includes:
 drawing the secondary air into the secondary air inlet chamber via a venturi effect.

19. The method according to claim 14, further including sensing an environmental condition associated with the secondary air via a smoke sensor positioned within the secondary air inlet chamber including:
 sensing the environmental condition associated with the secondary air via the smoke sensor that has a respective portion that extends through a corresponding opening of the housing, wherein the opening is proximate to the secondary air inlet chamber.

20. The method according to claim 14, wherein receiving the primary air via the primary air inlet port includes:
 receiving the primary air via a primary air inlet port that defines a slip fitting configured to be slip-fitted to a section of the air distribution plenum.

\* \* \* \* \*